United States Patent
Strobel

(10) Patent No.: US 7,055,774 B2
(45) Date of Patent: Jun. 6, 2006

(54) BELT RETRACTOR

(75) Inventor: Ralf Strobel, Gmünd (DE)

(73) Assignee: TRW Occupant Restraint Systems GmbH & Co. KG, Aldorf (DE)

(*) Notice: Subject to any disclaimer, the term of this patent is extended or adjusted under 35 U.S.C. 154(b) by 168 days.

(21) Appl. No.: 10/706,444

(22) Filed: Nov. 12, 2003

(65) Prior Publication Data

US 2004/0095010 A1    May 20, 2004

(30) Foreign Application Priority Data

Nov. 14, 2002    (DE) .......................... 202 17 632 U

(51) Int. Cl.
*B60R 22/38*    (2006.01)

(52) U.S. Cl. ............................. 242/382.1; 242/383.1; 280/807

(58) Field of Classification Search ............. 242/382.1, 242/383.1, 384.1; 280/806, 807
See application file for complete search history.

(56) References Cited

U.S. PATENT DOCUMENTS 5,628,469 A    5/1997    Fohl ........................... 242/374
6,454,201 B1    9/2002    Strobel et al. ........... 242/379.1

FOREIGN PATENT DOCUMENTS

| DE | 4438097 | 5/1996 |
| DE | 4001240 | 7/1998 |
| DE | 29912154 | 12/1999 |
| DE | 20109534 | 11/2001 |
| WO | 96/01751 | 1/1996 |

*Primary Examiner*—John Q. Nguyen
(74) *Attorney, Agent, or Firm*—Tarolli, Sundheim, Covell & Tummino L.L.P.

(57) ABSTRACT

A belt retractor for a vehicle safety belt comprises a belt spool (12) rotatably mounted in a frame (10) and a coupling disc (32) rotatably mounted relative to the belt spool. With a rotation relative to the belt spool, the coupling disc can bring about a locking of the rotation of the belt spool in unwinding direction of the safety belt. The belt spool has a first friction element (22) and the coupling disc has a second friction element (66). The first and second friction elements are positioned such that they are able to connect the belt spool and the coupling disc with each other with a friction fit.

8 Claims, 6 Drawing Sheets

BELT RETRACTOR

TECHNICAL FIELD

The invention relates to a belt retractor for a vehicle safety belt.

BACKGROUND OF THE INVENTION

Conventional belt retractors usually have a belt spool mounted rotatably in a frame and a coupling disc rotatably mounted relative to the belt spool, which coupling disc, with a rotation relative to the belt spool, can bring about a locking of the rotation of the belt spool in the unwinding direction of the safety belt.

Generic belt retractors, as known for instance from the German Utility Model 201 09 534, serve to provide safety belt band to a vehicle occupant. Normally, the belt band can be withdrawn from the belt spool against the resistance of a spring element. In the blocked state, a withdrawal of belt band is not possible, a differentiation being made basically between two blocking modes. If the blocking takes place as a function of the forces acting on the belt band, then one speaks of belt band-sensitive activation of the locking; if it is determined by the acceleration forces acting on the vehicle, one speaks of vehicle-sensitive activation of the locking.

For the belt band-sensitive activation of the locking mechanism of a belt retractor, a coupling disc is arranged on the belt spool so as to be rotatable relative thereto. If the coupling disc, owing to its mass moment of inertia, remains behind the rotation of the belt spool, then through an actuating element it causes the pivoting of a locking catch which thus can be guided into locking teeth. For vehicle-sensitive activation, the coupling disc is provided on its outer periphery with teeth into which a blocking element of a vehicle-sensitive sensor can engage, in order to thus make possible the process of guiding the locking catch into the locking teeth.

In order to make possible the renewed retraction of the safety belt, it is necessary to unlock the belt retractor. Whereas the unlocking path with belt band-sensitive locking is already very small, for the unlocking of the vehicle-sensitive locking, a shortening of the unlocking path is desired. According to prior art, in the case of vehicle-sensitive locking, additional components are required for shortening the unlocking path, which lead to increased costs with regard to components and installation.

The invention provides a belt retractor by which a drastic shortening of the unlocking path becomes possible after vehicle-sensitive locking on back rotation of the belt spool.

BRIEF SUMMARY OF THE INVENTION

According to the invention, a belt retractor for a vehicle safety belt comprises a belt spool rotatably mounted in a frame and a coupling disc rotatably mounted relative to the belt spool. With a rotation relative to the belt spool, the coupling disc can bring about a locking of the rotation of the belt spool in unwinding direction of the safety belt. The belt spool has a first friction element and the coupling disc has a second friction element. The first and second friction elements are positioned such that they are able to connect the belt spool and the coupling disc with each other with a friction fit. This friction-fit connection, resulting from the contact of the first and second friction elements, between the belt spool and coupling disc makes it possible that with a necessary unlocking after a vehicle-sensitive locking of the belt retractor, the belt spool directly entrains the coupling disc on its back rotation and therefore ensures that the sensor lever for the vehicle-sensitive locking is freed after a very short back rotation path, whereby the vehicle-sensitive locking can be terminated. With a further back rotation of the belt spool, the locking catch rolls on the locking teeth, so that the actuating element connected with the coupling disc forces a relative movement between belt spool and coupling disc, which leads to the first and second friction elements separating from each other, whereby the friction connection is released and the coupling disc is freed again. This solution does not require any additional components, whereby the component- and installation costs are reduced compared with solutions according to the prior art for shortening the unlocking path.

In a preferred embodiment, the first friction element is a pin element and the second friction element is connected elastically with the coupling disc. It is by means of injection molding that the second friction element can be easily formed on the coupling disc and the pin element onto the belt spool.

In a further embodiment of the invention, the second friction element has an extension and the belt retractor has a housing element firmly connected with the frame, which element receives the coupling disc. In addition, the housing element has arresting teeth and the extension can come into engagement with the arresting teeth, the belt spool and the coupling disc being able to arrive from a position in which they are connected with each other by friction fit into a position in which they are rotatable relative to each other. Also in this embodiment, the belt spool and coupling disc are firstly connected by friction fit with each other on a back rotation of the belt spool, and the vehicle-sensitive locking is discontinued after a very short back rotation path. On further back rotation of the belt spool, the arresting teeth make it possible that the extension arranged on the second friction element abuts at the arresting teeth, whereby the coupling disc is stopped, the first and second friction elements can reliably be detached from each other, whereby the friction connection between the belt spool and coupling disc is discontinued.

Further advantageous developments of the invention will be apparent from the sub-claims.

DETAILED DESCRIPTION OF THE PREFERRED EMBODIMENTS

Figure 1:
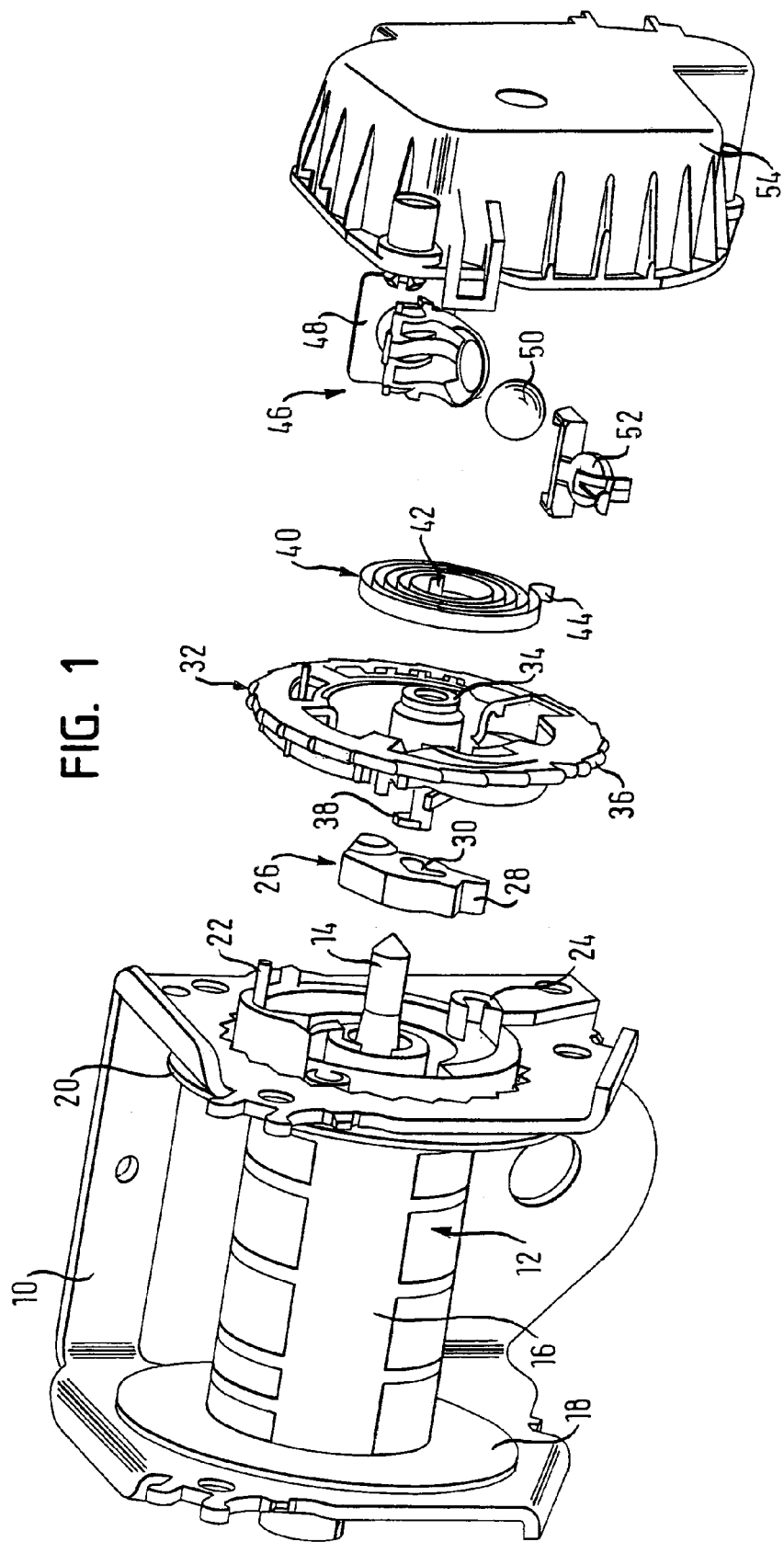
FIG. 1 shows an exploded view of the belt retractor according to the invention.

In FIG. 1, a belt retractor is illustrated in an exploded view. This has a frame 10, a belt spool 12, a locking catch 26, a coupling disc 32, a spiral spring 40, a vehicle-sensitive sensor 46 and a housing element 54.

The belt spool 12 has a spool axle 14, by which the belt spool is mounted rotatably in the frame 10. The belt spool comprises a substantially cylindrical spool body 16 and two flanges 18 and 20, which delimit the spool body 16 to the right and left with respect to FIG. 1. A belt band (not illustrated) can be wound on the spool body between the two flanges 18 and 20. On the right-hand flange 20 of the belt spool 12, with respect to FIG. 1, on the outer side of the belt spool a first friction element 22 and a receiving pocket 24 are arranged, the function of which is explained further below.

The locking catch 26 has at least one blocking tooth 28 and a control contour 30.

The coupling disc 32 has a central opening 34, through which the spool axle 14 of the belt spool 12 can pass, whereby a coaxial connection can be produced between the coupling disc and belt spool. On its outer periphery the coupling disc is provided with control teeth 36. The coupling disc has in addition an actuating element 38 which can engage into the control contour 30 of the locking catch 26.

The spiral spring 40 comprises a first spring end 42 and a second spring end 44.

The vehicle-sensitive sensor 46 consists of a bearing 48, a sensor ball 50 movably mounted therein and a sensor lever 52, which is in contact with the sensor ball and can be moved by the latter.

A housing element 54 closes off from the environment the locking catch 26, coupling disc 32, spiral spring 40 and vehicle-sensitive sensor 46 and also the region of the flange 20 on the outer side of the belt spool.

Figure 2:
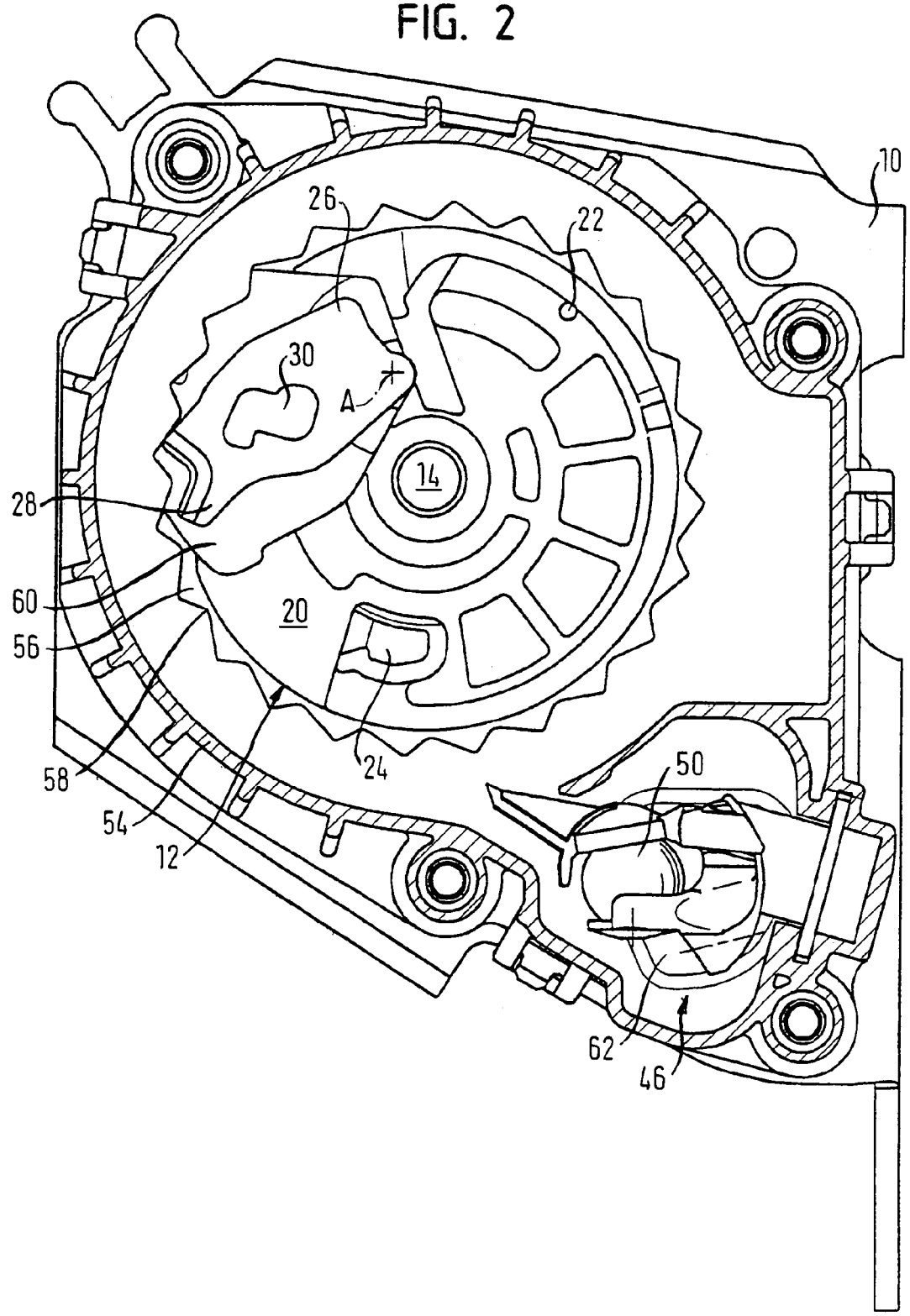
FIG. 2 shows a diagrammatic side view of the belt retractor according to the invention, without a coupling disc.

FIG. 2 shows the belt retractor in a side view, the coupling disc and spiral spring having been removed and the housing element 54 being shown in section. Situated in the frame 10 is a first opening 56, which is bordered over 360 degrees by locking teeth 58. Inside the first opening 56, the region of the flange 20 of the belt spool 12 on the outer side of the belt spool can be seen. On this, a pocket 60 is recessed, on which the locking catch 26 is arranged. The control contour 30 of the locking catch 26 is composed of at least two, here three approximately rectangular recesses, which each are arranged at right angles to each other. The locking catch 26 is mounted in a bearing hole (not illustrated) of the belt spool 12 so as to be pivoting about an axis A perpendicular to the plane of the drawing, and is constructed such that the blocking tooth 28 can be guided into the locking teeth 58. On the region of the flange 20 on the outer side of the belt spool, there is further provided the first friction element 22, constructed as a pin element. The vehicle-sensitive sensor 46 is securely mounted on the housing element 54 and is received in the frame 10 by a second opening 62.

Figure 3:
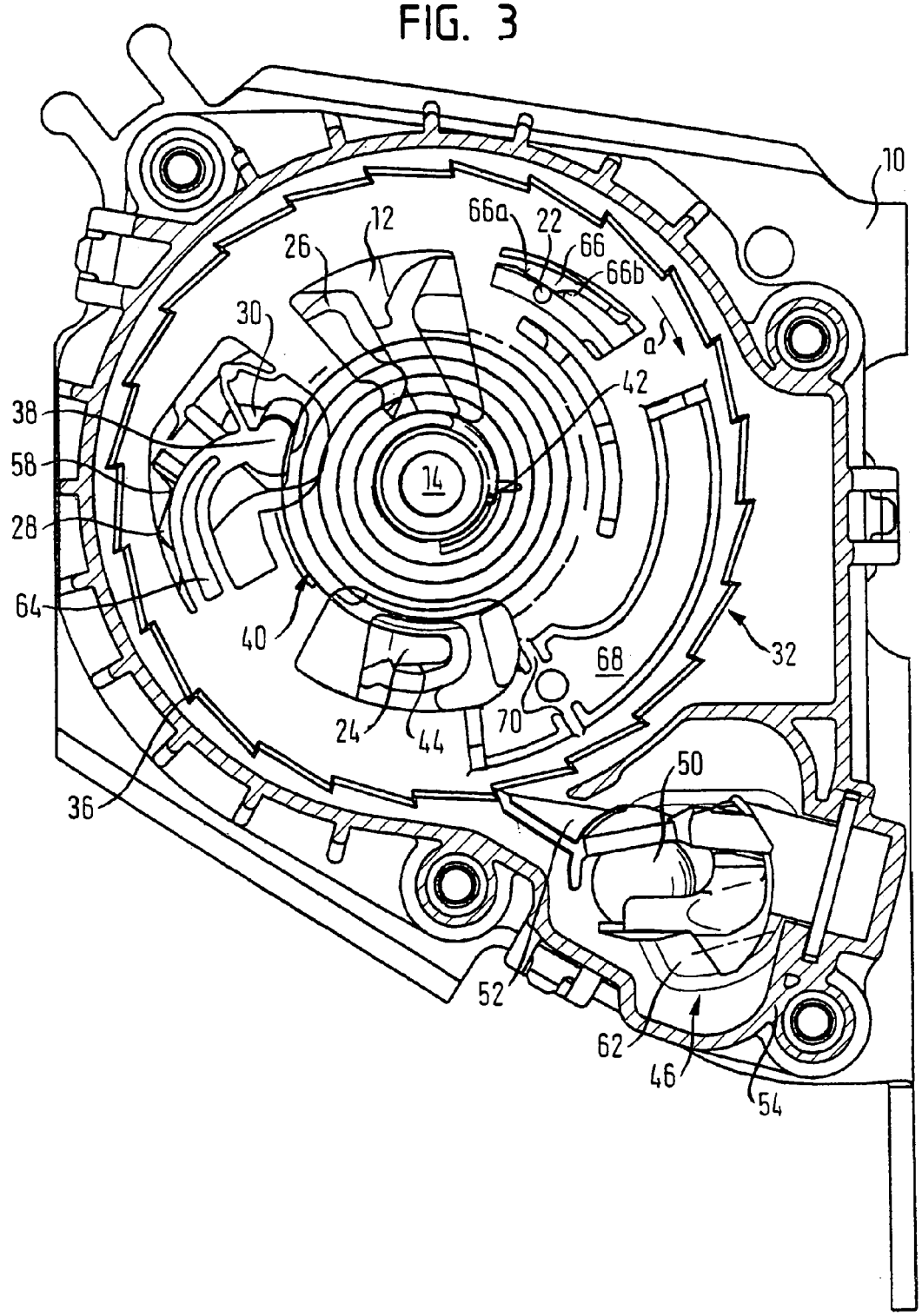
FIG. 3 shows a diagrammatic side view, partially in section, of a first embodiment of the belt retractor according to the invention with the locking catch guided into the locking teeth.
Figure 4:
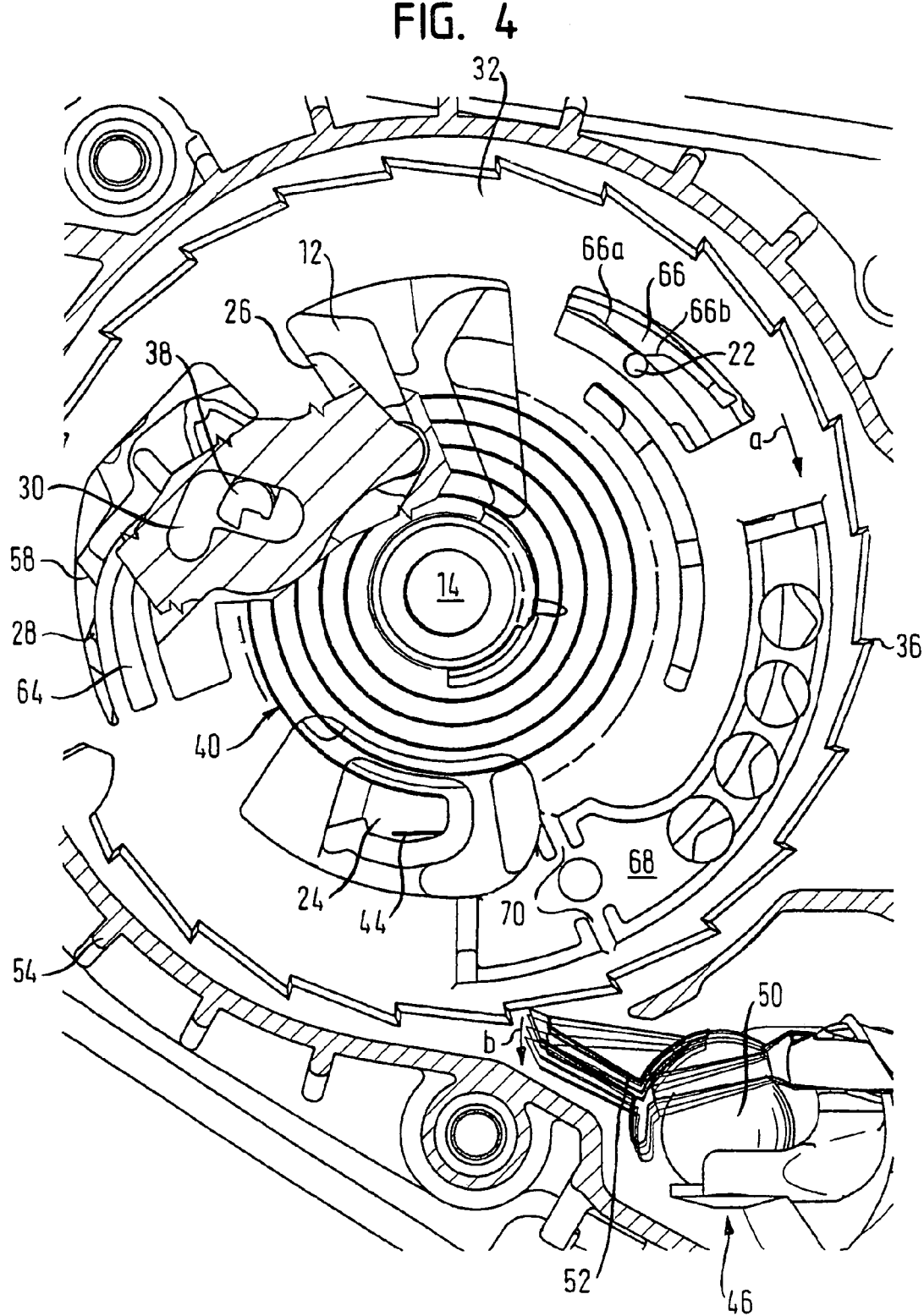
FIG. 4 shows a diagrammatic side view, partially in section and broken, of the first embodiment of the belt retractor according to the invention.

In FIGS. 3 and 4, the belt retractor is illustrated in side view with coupling disc 32 and spiral spring 40, with the housing element 54 shown in section. The coupling disc 32 is rotatably mounted on the spool axle 14 of the belt spool 12. The actuating element 38 is connected via a connecting arm 64 with the coupling disc 32 and engages into the control contour 30 of the locking catch 26. The first spring end 42 of the spiral spring 40 is arrested close to the spool axle 14 on the coupling disc 32. The second spring end 44 lies in the receiving pocket 24 of the belt spool 12, whereby a spring coupling is produced between the coupling disc 32 and the belt spool 12. If the sensor lever 52, as in FIG. 3, is guided into the control teeth 36, then the spiral spring 40 usually exerts a rotation force onto the coupling disc, by which the coupling disc is pressed anticlockwise with respect to FIG. 3 against the sensor lever 52 and the latter is thereby arrested in the control teeth 36. A second friction element 66 is connected in one piece with the coupling disc 26 and has two sides 66a and 66b facing the first friction element 22, by means of which sides 66a and 66b it can cooperate with the first friction element 22 of the belt spool. The coupling disc 32 additionally has an inertia element 68, which is formed on the coupling disc 32 via connecting cross-pieces 70.

The unlocking function of the first embodiment of the belt retractor is to be described below. The initial position here is FIG. 3, in which the locking catch 26 is guided into the locking teeth 58. The first friction element 22, constructed as a pin element, lies here on the first side 66a of the second friction element 66, whereby a friction connection exists between coupling disc 32 and belt spool 12. Owing to this friction connection, the belt spool 12 entrains the coupling disc 32 on further rotation clockwise with respect to FIGS. 3 and 4 (arrow a). The friction force of the first friction element 22 on the first side 66a must be greater here than the restoring force of the spiral spring 40, because otherwise the first friction element 22 arrives at the second side 66b of the second friction element and the direct contact between belt spool and coupling disc is discontinued, which would bring about a continued arresting of the sensor lever 52 in the control teeth 36. If the first and second friction elements are in contact with each other, then the sensor lever 52, through the forced, clockwise rotation of the coupling disc 32 is already freed after a very short rotation path of the belt spool 12 and can swivel out from the control teeth 36, as illustrated in FIG. 4 with the aid of the different positions of the sensor lever 52 (movement of the sensor lever in arrow direction b).

A further rotation of the belt spool 12 in arrow direction a leads to the blocking tooth 28 of the locking catch 26 rolling on the locking teeth 58. Thereby, by means of the control contour 30 of the locking catch 26, a movement is brought about of the actuating element 38, the latter being connected with the coupling disc 32. This movement of the actuating element 38 forces a slight displacement of the coupling disc 32 with respect to the belt spool 12 in anticlockwise direction, whereby the first friction element 22 arrives at the second side 66b of the second friction element 66. Thereby, the friction connection is released and the firm coupling between coupling disc 32 and belt spool 12 is discontinued.

Figure 5:
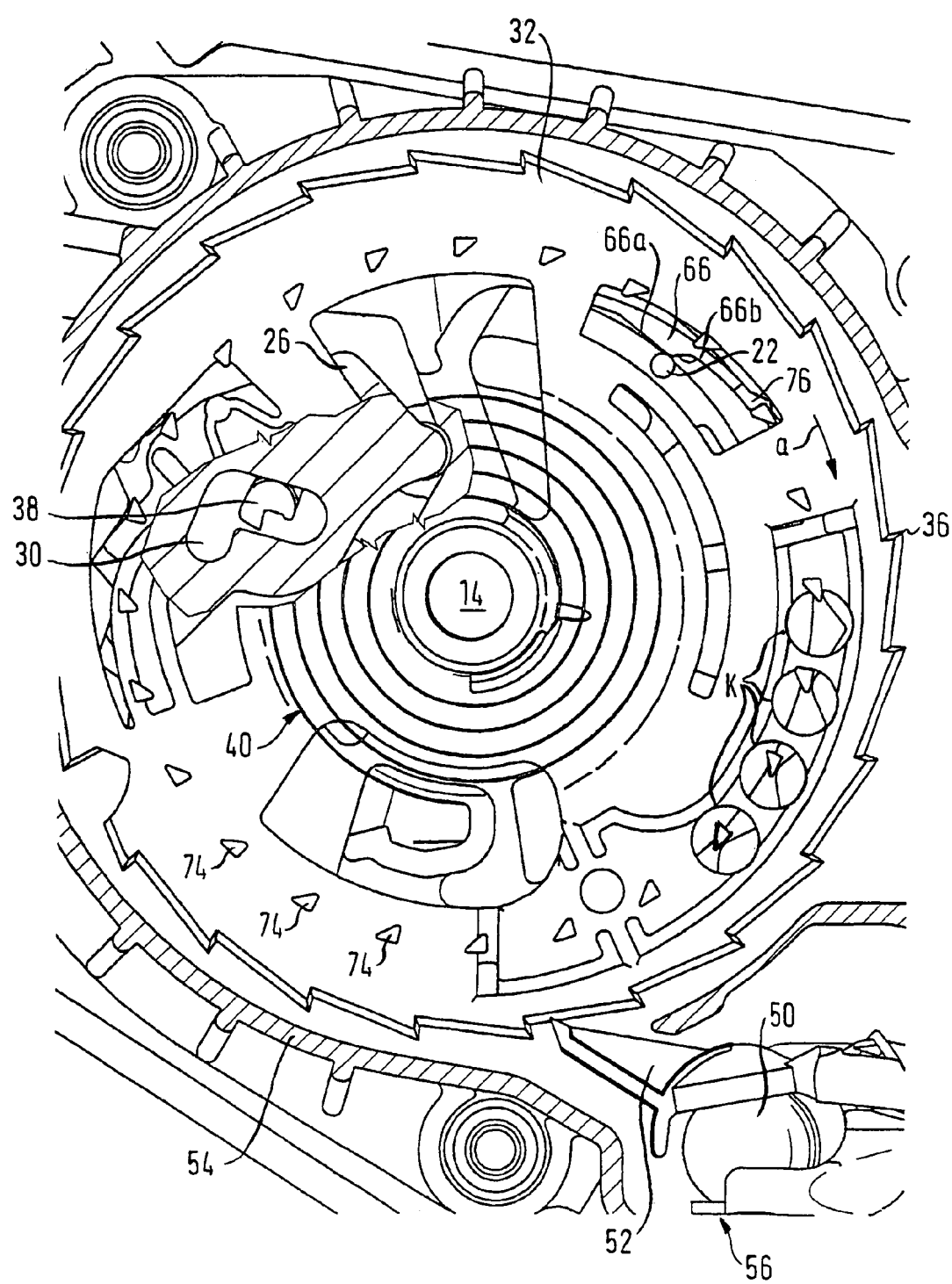
FIG. 5 shows a diagrammatic side view, partially in section and broken, of a second embodiment of the belt retractor according to the invention, with the locking catch partially guided into the locking teeth.
Figure 6:
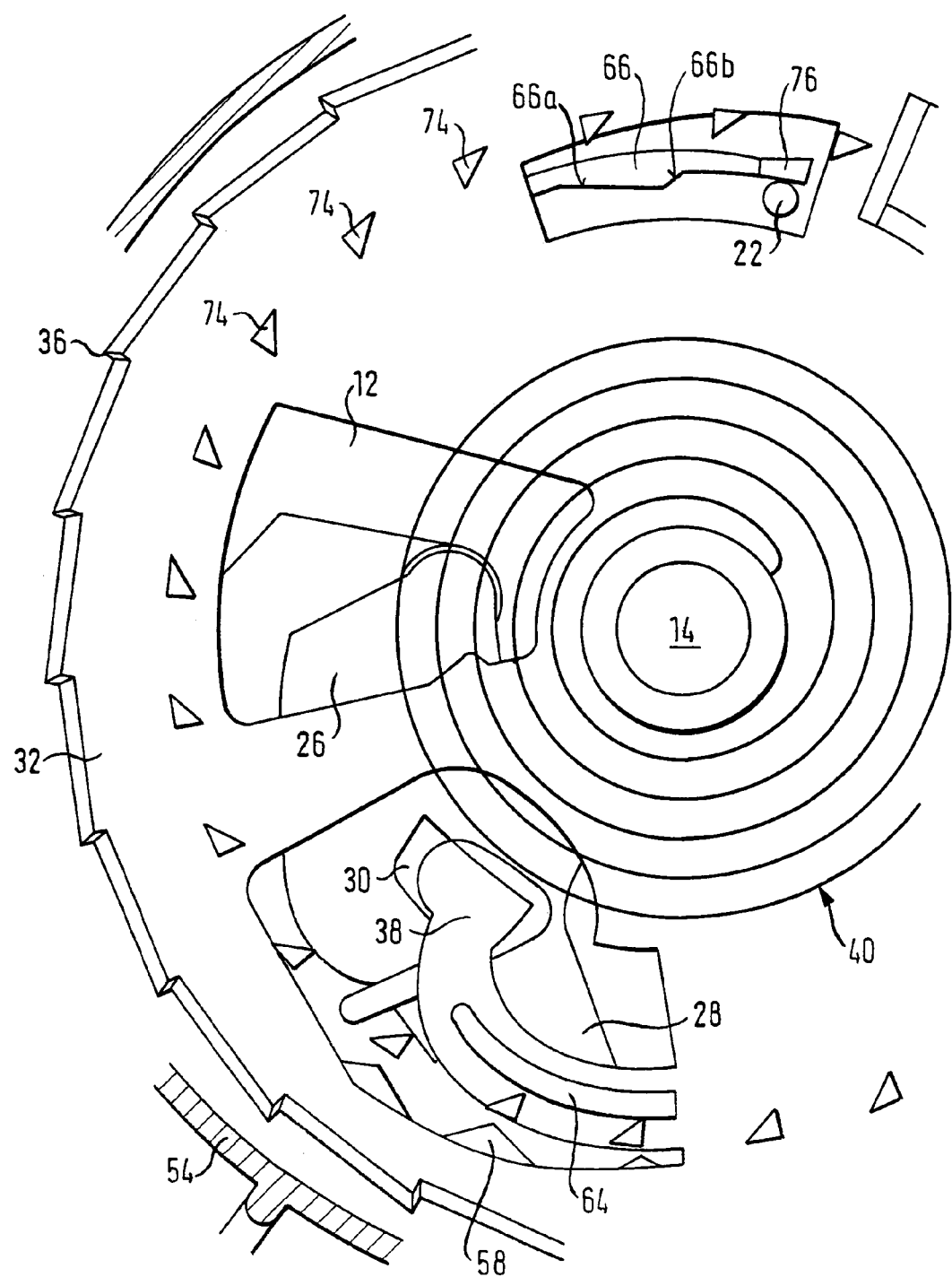
FIG. 6 shows a diagrammatic detailed view, partially in section, of the second embodiment of the belt retractor according to the invention, with the locking catch guided out from the locking teeth.

In a second embodiment, as can be seen in FIGS. 5 and 6, the housing element 54 has arresting teeth which are composed of a plurality of tooth elements 74 which lie equidistant on a circle, the central point of which coincides with the spool axle 14. The angular distance of the tooth elements 74 here is identical both with the angle difference between two teeth of the control teeth 36 of the coupling disc 32 and with that between two teeth of the locking teeth 58 (see circular cutouts K in FIG. 5). The second friction element 66 has an extension 76, the positions of extension 76 and tooth elements 74 being selected such that the extension can come into engagement with the tooth elements of the arresting teeth, when the first friction element is in the transition region between the two flanks 66a and 66b of the second friction element.

The function of the second embodiment of the belt retractor is described below. In the initial position (FIG. 5) the vehicle-sensitive locking is already discontinued corresponding to the description of the first embodiment, i.e. the sensor lever 52 is no longer retained by the control teeth 36 and can swivel out. On further back rotation of belt spool 12 and coupling disc 32 in arrow direction a, the coupling disc is stopped with the extension 76 on one of the tooth elements 74 of the arresting teeth. As the belt spool 12 can now rotate further clockwise with respect to the coupling disc 32, the first friction element 22 can move from the first side 66*a* to the second side 66*b* of the second friction element 66. The friction connection between the first friction element 22 and the second friction element 66 is now released (end position FIG. 6) and the firm coupling between coupling disc 32 and belt spool is discontinued.

It is to be understood that the arresting teeth can also be arranged on other fixed parts of the belt retractor, as long as thereby a defined position of the tooth elements 74 is ensured with respect to the second friction element 66 of the coupling disc and therefore with respect to the sensor 46.

The invention claimed is:

1. A belt retractor for a vehicle safety belt, comprising a belt spool (12) rotatably mounted in a frame (10), a coupling disc (32) rotatably mounted relative to said belt spool, which with a rotation relative to said belt spool can bring about a locking of a rotation of said belt spool in unwinding direction of said safety belt, characterized in that said belt spool has a first friction element (22) and said coupling disc has a second friction element (66), said first and second friction elements being positioned such that they are able to connect said belt spool and said coupling disc with each other with a friction fit after a vehicle-sensitive locking of said belt spool (12) so that the belt spool (12) can entrain said coupling disc (32) to terminate the locking of said belt spool (12).

2. The belt retractor according to claim 1, wherein termination of the locking of said belt spool (12) is initiated by a rotation of said belt spool (12) in winding direction of said safety belt.

3. The belt retractor according to claim 1, characterized in that said second friction element (66) is connected elastically with said coupling disc (32).

4. The belt retractor according to claim 1, characterized in that said second friction element (66) has an extension (76).

5. The belt retractor according to claim 1, characterized in that said coupling disc (32) is received by a housing element (54) which is firmly connected with said frame (10).

6. The belt retractor according to claim 5, characterized in that said second friction element has an extension said housing element (54) has arresting teeth and said extension (76) can come into engagement with said arresting teeth, said belt spool (12) and said coupling disc (32) being able to move from a position in which they are connected with each other with a friction fit into a position in which they are rotatable relative to each other.

7. The belt retractor according to claim 6, characterized in that said arresting teeth comprise tooth elements (74) which, lie equidistant on a circular line.

8. A belt retractor for a vehicle safety belt, comprising a belt spool (12) rotatably mounted in a frame (10), a coupling disc (32) rotatably mounted relative to said belt spool, which with a rotation relative to said belt spool can bring about a locking of a rotation of said belt spool in unwinding direction of said safety belt, characterized in that said belt spool has a first friction element (22) and said coupling disc has a second friction element (66), said first and second friction elements being positioned such that they are able to connect said belt spool and said coupling disc with each other with a friction fit, characterized in that said first friction element (22) is a pin element.

* * * * *